(12) United States Patent
Ranney et al.

(10) Patent No.: US 11,131,741 B2
(45) Date of Patent: Sep. 28, 2021

(54) METHOD AND APPARATUS FOR PROVIDING A PASSIVE TRANSMITTER BASED SYNTHETIC APERTURE RADAR

(71) Applicant: U.S. Army Research Laboratory ATTN: RDRL-LOC-I, Adelphi, MD (US)

(72) Inventors: Kenneth Irving Ranney, Rockville, MD (US); Gregory James Mazzaro, Charleston, SC (US); Kyle Alexander Gallagher, Silver Spring, MD (US); Stephen Freeman, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 367 days.

(21) Appl. No.: 16/117,346

(22) Filed: Aug. 30, 2018

(65) Prior Publication Data
US 2020/0025855 A1    Jan. 23, 2020

Related U.S. Application Data

(63) Continuation of application No. 15/671,579, filed on Aug. 8, 2017, now Pat. No. 10,649,080.

(51) Int. Cl.
*G01S 3/04* (2006.01)
*G01S 13/90* (2006.01)

(52) U.S. Cl.
CPC .............. *G01S 3/046* (2013.01); *G01S 3/043* (2013.01); *G01S 13/90* (2013.01); *G01S 13/9004* (2019.05); *G01S 13/9005* (2013.01); *G01S 13/9019* (2019.05); *G01S 13/9021* (2019.05)

(58) Field of Classification Search
CPC .. G01S 13/90; G01S 13/9004; G01S 13/9021; G01S 13/9019; G01S 13/9005
See application file for complete search history.

(56) References Cited

U.S. PATENT DOCUMENTS

| 5,086,300 A | 2/1992 | Ashmore |
| 5,448,241 A * | 9/1995 | Zeoli ........................ G01S 13/90 |
| | | 342/25 A |
| 5,543,779 A | 8/1996 | Aspesi et al. |

(Continued)

OTHER PUBLICATIONS

U.S. Appl. No. 15/671,579, filed Aug. 8, 2017, titled "Passive Non-Linear Synthetic Aperture Radar and Method Thereof".

(Continued)

*Primary Examiner* — Thomas M Hammond, III
(74) *Attorney, Agent, or Firm* — Eric B. Compton

(57) ABSTRACT

A method and apparatus for receiving signals from an unknown transmitting source and providing the location of the unknown transmitting source comprising a series of channels for receiving signals radiated by the unknown transmitting sources, generating preprocessed time domain data and generating a SAR image depicting a location of the unknown transmitting source, and a processor for processing the preprocessed time domain data to enhance a pixel value at each pixel location within the SAR image by summing signal data from each channel related to each pixel location to generate an enhanced SAR image.

18 Claims, 13 Drawing Sheets

(56) References Cited

U.S. PATENT DOCUMENTS

| | | | |
|---|---|---|---|
| 7,330,565 B1* | 2/2008 | Der | G06K 9/3241 340/933 |
| 8,537,050 B2 | 9/2013 | Freeman et al. | |
| 8,624,773 B2 | 1/2014 | Nguyen et al. | |
| 8,824,544 B2 | 9/2014 | Nguyen | |
| 9,075,129 B2 | 7/2015 | Nguyen | |
| 9,250,323 B2 | 2/2016 | Ranney et al. | |
| 9,329,264 B2* | 5/2016 | Jin | G01S 13/5242 |
| 9,395,434 B2 | 7/2016 | Mazzaro et al. | |
| 2001/0041552 A1 | 11/2001 | Wingren | |
| 2011/0012778 A1* | 1/2011 | Nguyen | G01S 13/9017 342/25 A |
| 2011/0163912 A1* | 7/2011 | Ranney | G01S 13/9089 342/25 F |
| 2011/0175771 A1* | 7/2011 | Raney | G01S 7/026 342/25 F |
| 2011/0216810 A1* | 9/2011 | Kumar | H04B 1/0483 375/146 |
| 2011/0267222 A1* | 11/2011 | Craig | G01S 3/30 342/25 B |
| 2012/0200446 A1* | 8/2012 | Shirakawa | G01S 7/40 342/27 |
| 2014/0009324 A1* | 1/2014 | Ranney | G01S 13/9089 342/161 |
| 2016/0061943 A1 | 3/2016 | Enomoto et al. | |
| 2016/0282457 A1 | 9/2016 | Mazzaro et al. | |
| 2017/0307726 A1 | 10/2017 | Mazzaro et al. | |
| 2018/0172824 A1* | 6/2018 | Beckett | G01S 13/90 |

OTHER PUBLICATIONS

D. Young, et al., "Ultra-Wideband (UWB) Transmitter Location Using Time Difference of Arrival (TDOA) Techniques," Conference Record of the 37th Asilomar Conference on Signals, Systems and Computers, (2004), 1225-1229 VoL2, DOI: 10.1109/ACSSC.2003.129218.

H. Leung and X. Liu, "Resolution enhancement in passive SAR imaging using distributed multiband fusion," Proceedings of 2013 IEEE Antennas and Propagation Society International Symposium (APSURSI), 2013, 1026-1027, DOI: 10.1109/APS.2013.6711173.

L. Nguyen, "Signal and Image Processing Algorithms for the U.S. Army Research Laboratory Ultra-wideband (UWB) Synchronous Impulse Reconstruction (SIRE) Radar," Army Research Laboratory Technical Report, ARL-TR-4784, pp. 27-29. (2009).

Ranney, K, et al. "Instantaneous, stepped-frequency, nonlinear radar," Proceedings of SPIE, vol. 9461 946122-6 (May 21, 2015); doi: 10.1117/12.2186620.

Orthogonal frequency-division multiplexing, from Wikipedia: https://en.wikipedia.org/wiki/Orthogonal_frequency-division_multiplexing (page indicates last edited Jan. 26, 2018).

IEEE 802.11g, from Wikipedia: https://en.wikipedia.Org/wiki/IEEE_802.11g-2003 (page indicated last edited Nov. 29, 2017).

Yuh-Ren Tsai; Guo-Xin Yu," Sensing of OFDM signals based on time-domain autocorrelation induced by guard subcarriers," 2017 IEEE 18th International Workshop on Signal Processing Advances in Wireless Communications (SPAWC) pp. 1-5.

Brian R. Phelan, Marc A. Ressler, Gregory J. Mazzaro, Kelly D. Sherbondy, Ram M. Narayanan, "Design of spectrally versatile forward-looking ground-penetrating radar for detection of concealed targets," Proc. SPIE 8714, Radar Sensor Technology XVII, 87140B (May 31, 2013).

F. Gustafsson and F. Gunnarsson, "Positioning Using Time-Difference Of Arrival Measurements", IEEE ICASSP 2003, Apr. 6-10, 2003, pp. VI-553-VI-556.

P. Shelswell, "The COFDM modulation system: the heart of digital audio broadcasting," IET Electronics & Communication Engineering Journal, 1995, vol. 7, Issue: 3, pp. 127-136.

L. Wang, B. Yazici, "Passive Imaging of Moving Targets Using Sparse Distributed Apertures," Siam J. Imaging Sciences, vol. 5, No. 3, 2012, pp. 769-808.

H. D. Giifiilhs and C. J. Baker, "Passive coherent location radar systems. Part 1: Performance prediction," IEE Proceedings of Radar, Sonar and Navigation, 152 (2005), pp. 153-159.

P. Falcone, F. Colone, C. Bongioanni, p. Lombardo, "Experimental Results for OFDM WiFi-Based Passive Bistatic Radar," Proceedings of the IEEE Radar Conference, Washington, DC, 2010, pp. 516-521.

C.J. Coleman, R.A. Watson, and H. Yardley, "A Practical Bistatic Passive Radar System for Use with DAB and DRM Illuminators," 2008 IEEE Radar Conference, pp. 1514-1519.

"Back Projection Algorithm," (subtopic of "Tomographic reconstruction"), Wikipedia, available at: https://en.wikipedia. 3rg/wiki/Tomographic_reconstruction#Back_Projection_Algorithm[2] (citing Dudgeon and Mersereau "Multidimensional digital signal processing," Prentice-Hall (1984)) (Wikipedia page indicates last edited on Jul. 24, 2018).

* cited by examiner

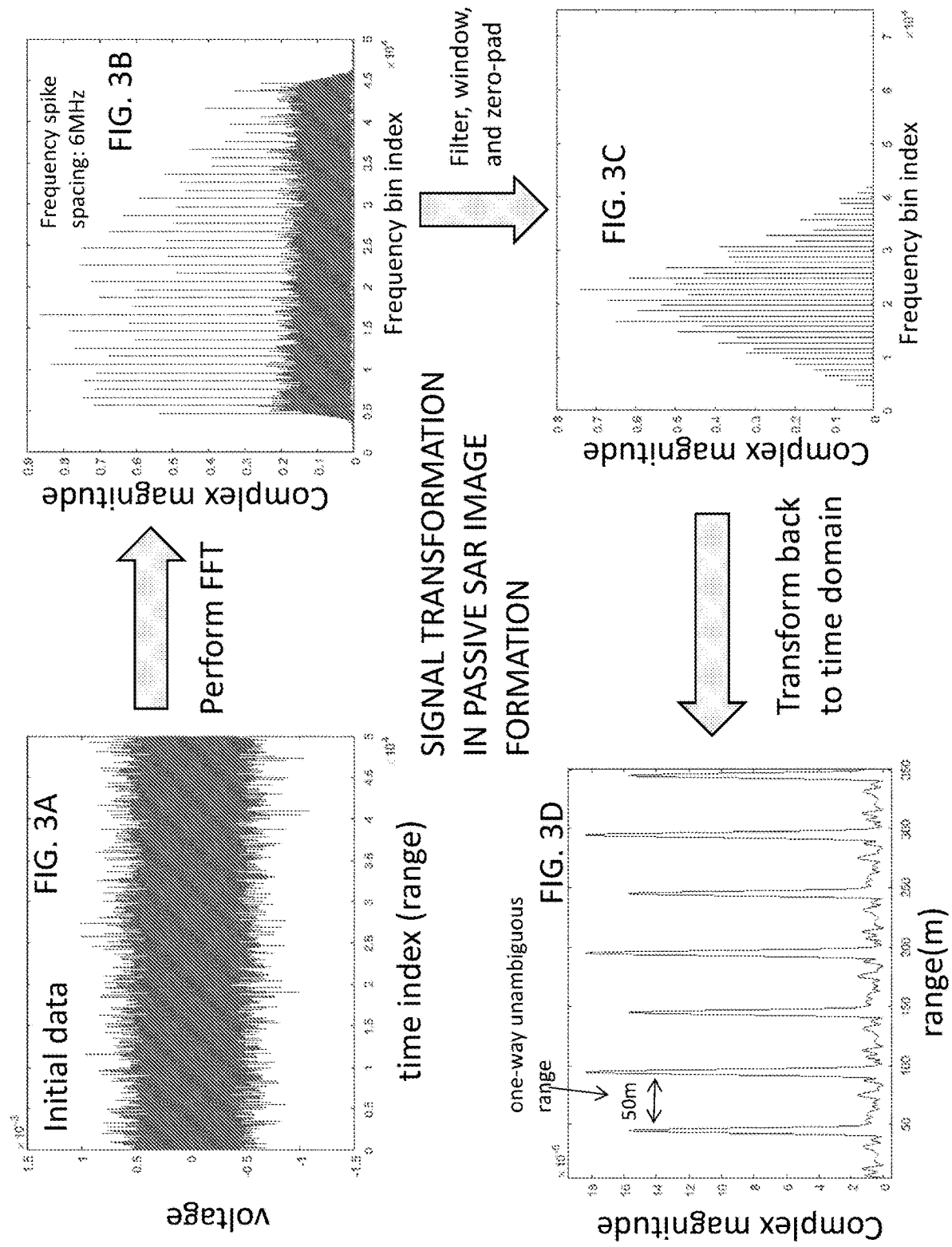

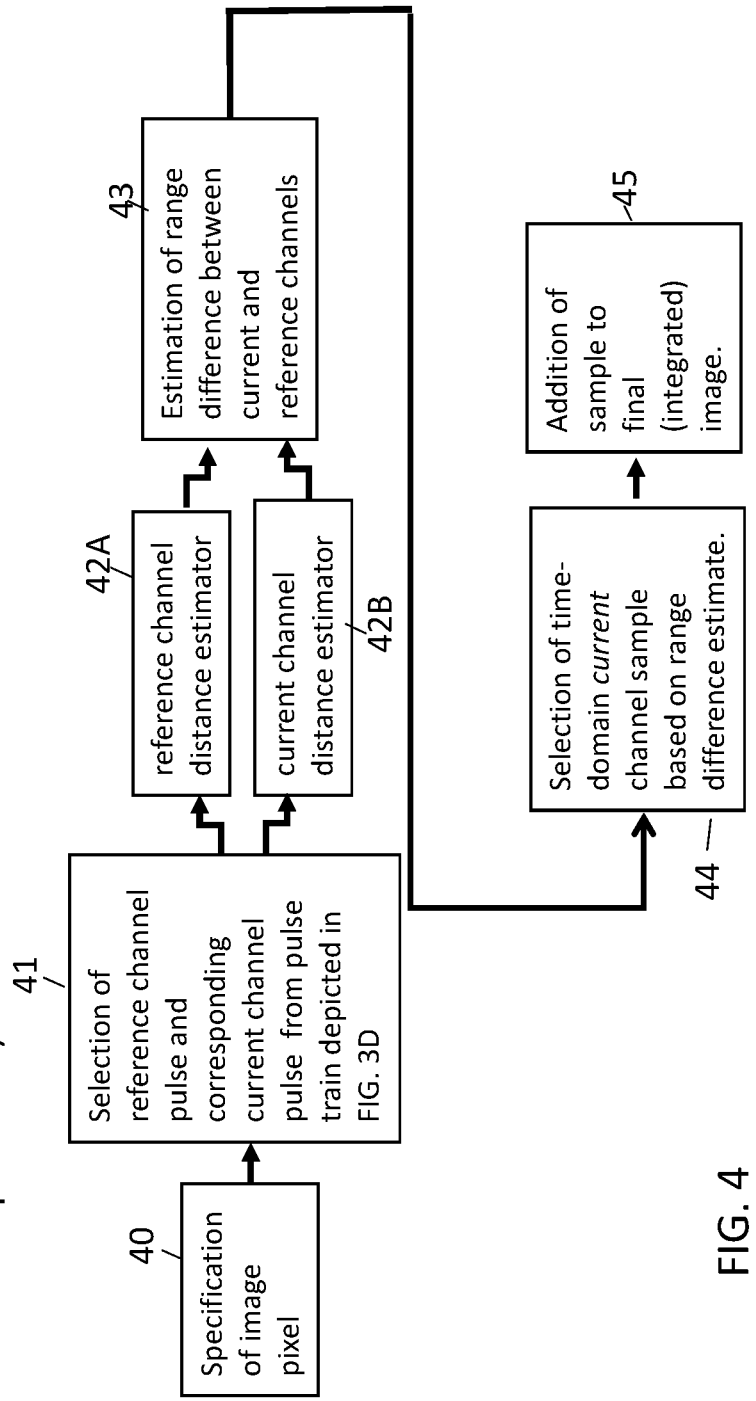
FIG. 4      IMAGE FORMATION – modified SAR image formation

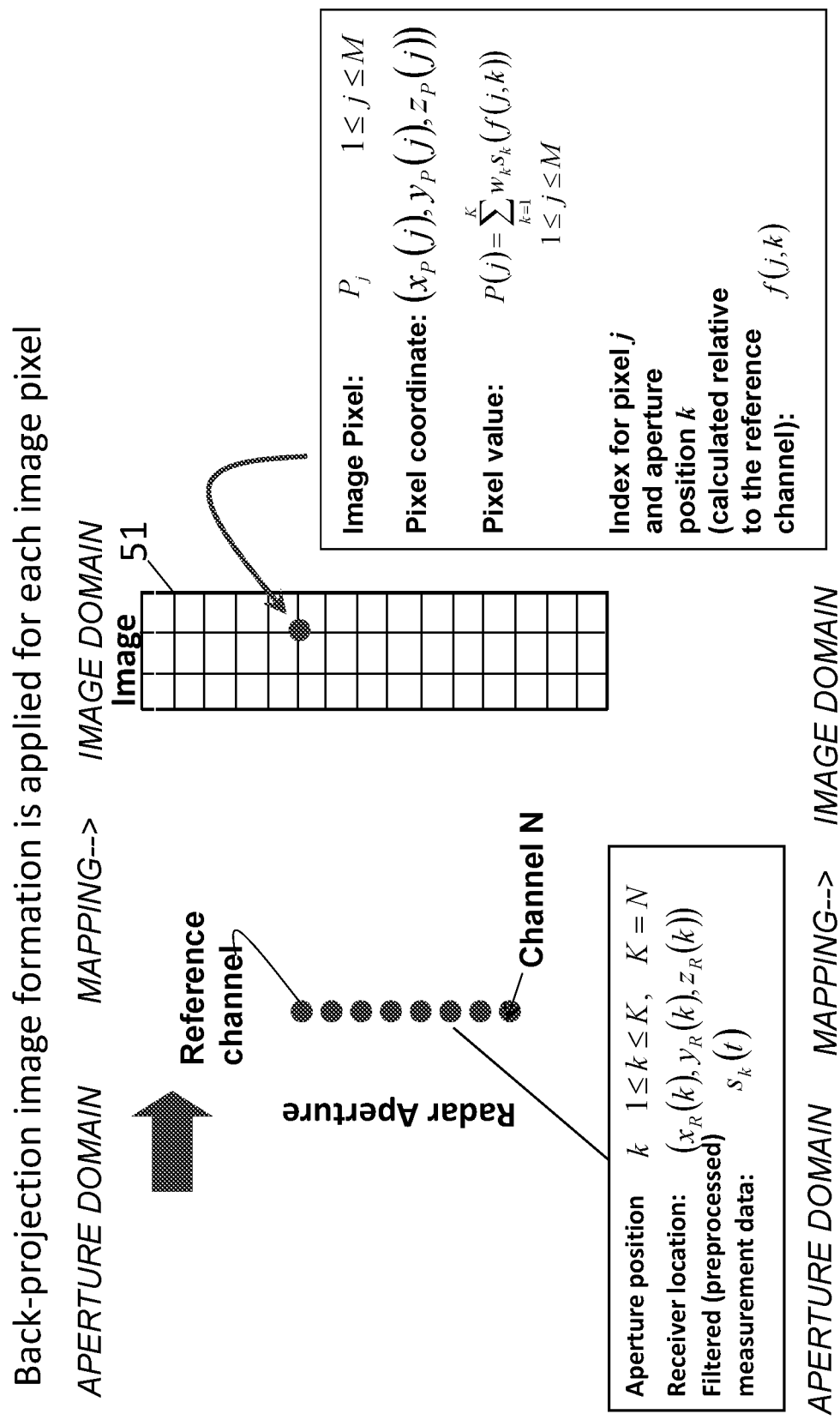
FIG. 5A IMAGE FORMATION USING MODIFIED SYNTHETIC APERTURE RADAR (SAR) IMAGE FORMATION

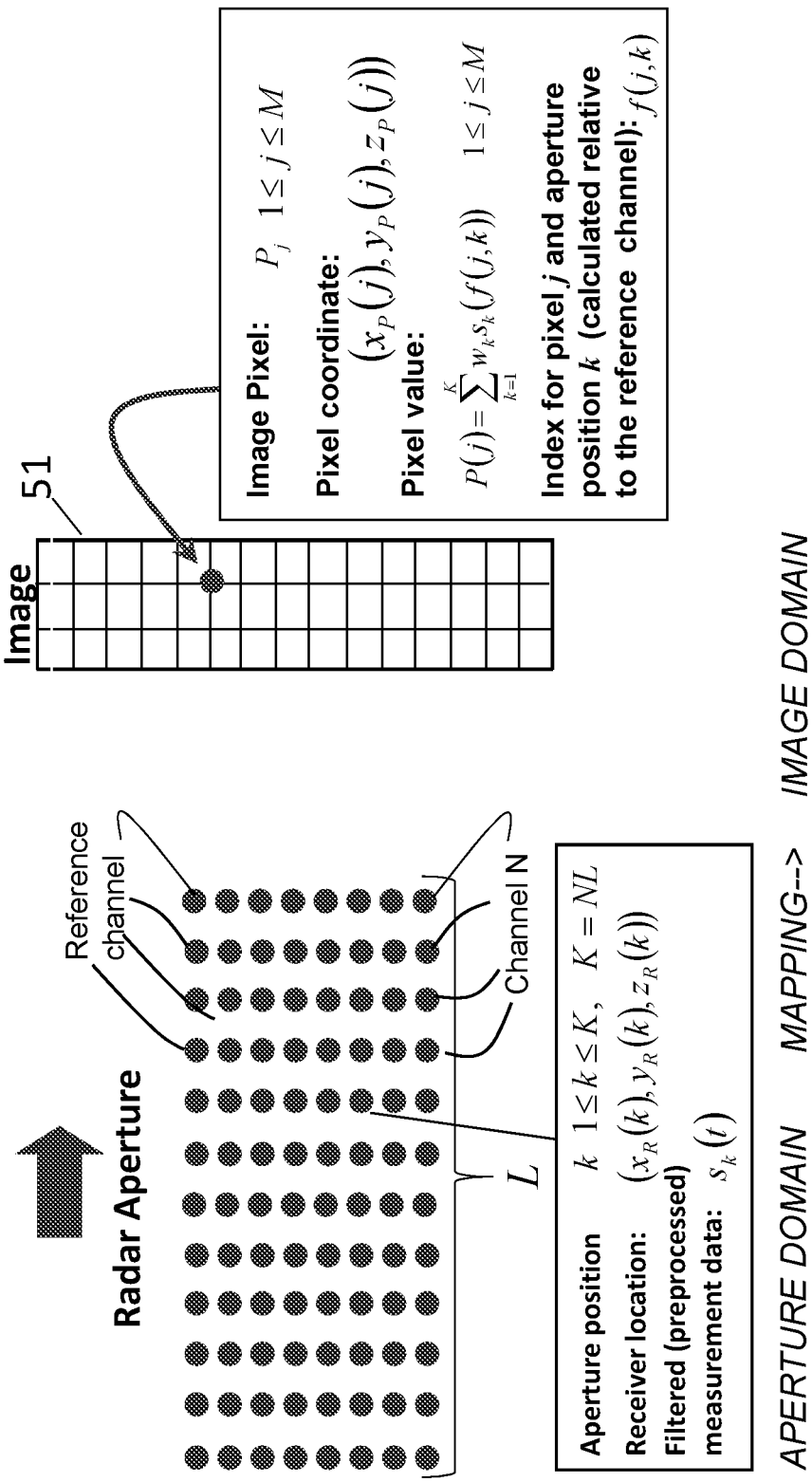
FIG. 5B IMAGE FORMATION USING MODIFIED SYNTHETIC APERTURE RADAR (SAR) IMAGE FORMATION - including multiple array locations that reflect an operational mode of system.

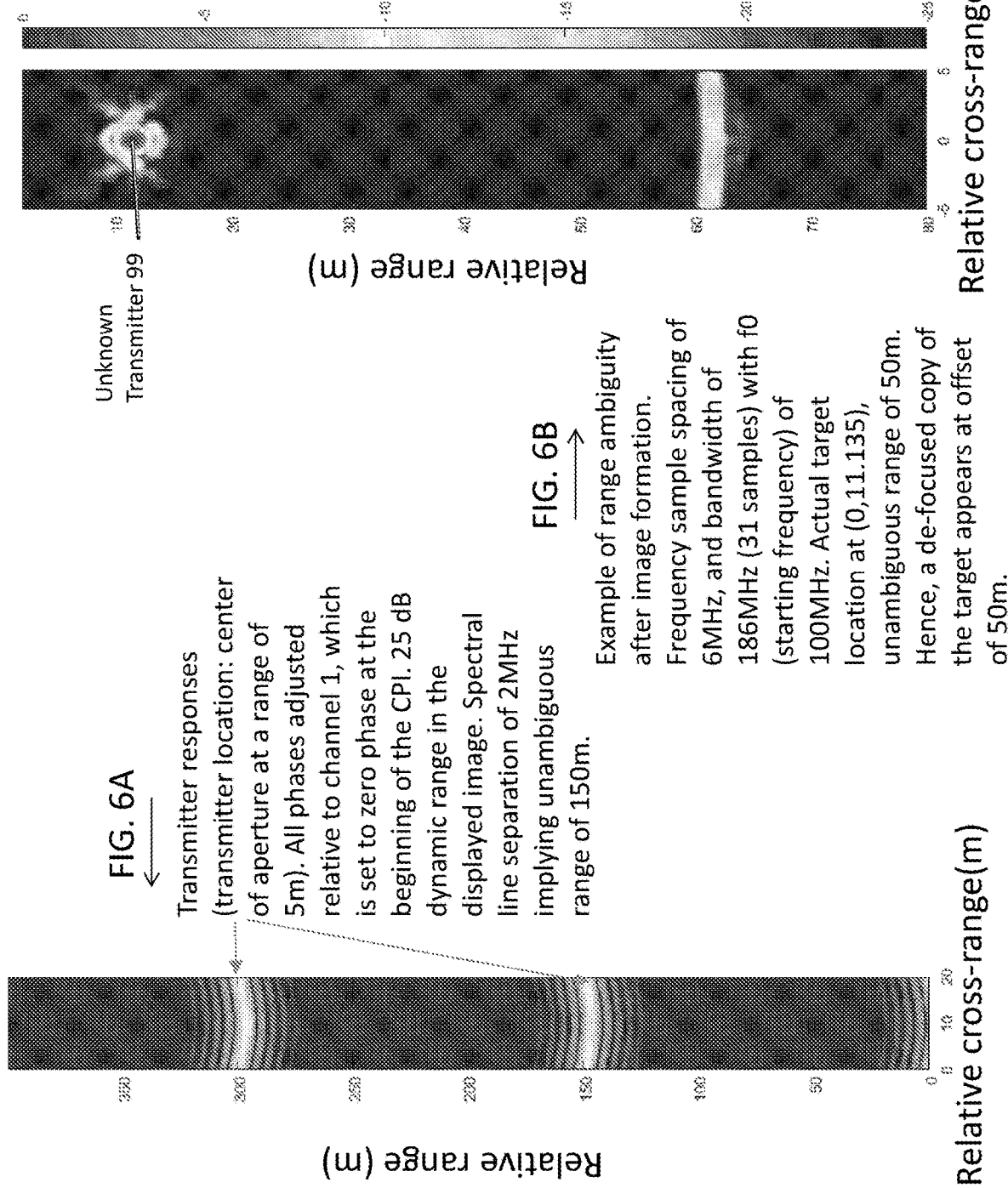

FIG. 6A

Transmitter responses (transmitter location: center of aperture at a range of 5m). All phases adjusted relative to channel 1, which is set to zero phase at the beginning of the CPI. 25 dB dynamic range in the displayed image. Spectral line separation of 2MHz implying unambiguous range of 150m.

FIG. 6B

Example of range ambiguity after image formation. Frequency sample spacing of 6MHz, and bandwidth of 186MHz (31 samples) with f0 (starting frequency) of 100MHz. Actual target location at (0,11.135), unambiguous range of 50m. Hence, a de-focused copy of the target appears at offset of 50m.

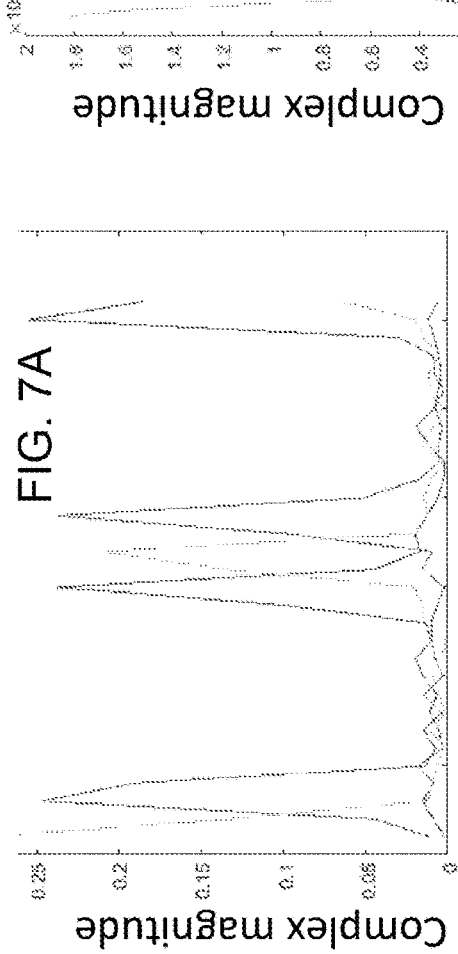

FIG. 7A
Data obtained by extracting signals at fixed frequency intervals throwing away zero-frequency bins, and NOT zero-padding in any way. Sequence contains only 31 elements.

FIG. 7B A portion of the result obtained by extracting data at fixed frequency intervals, retaining small frequency bins and zero-padding. Sequence repeats many times. Sequence length: 500650 elements.

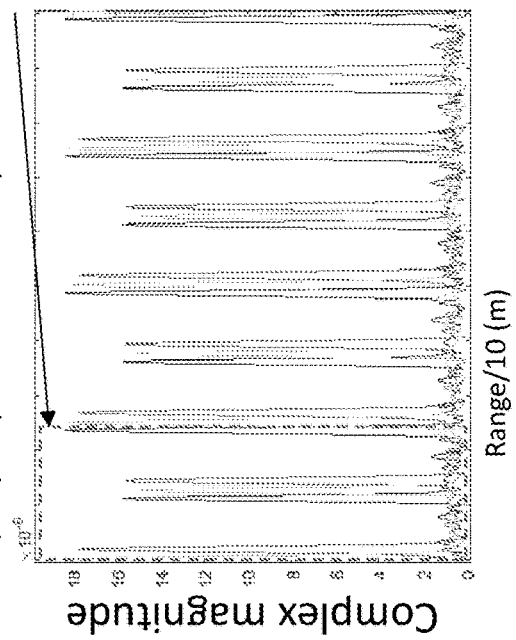

FIG. 7C Zoom-out of plot in FIG. 8B

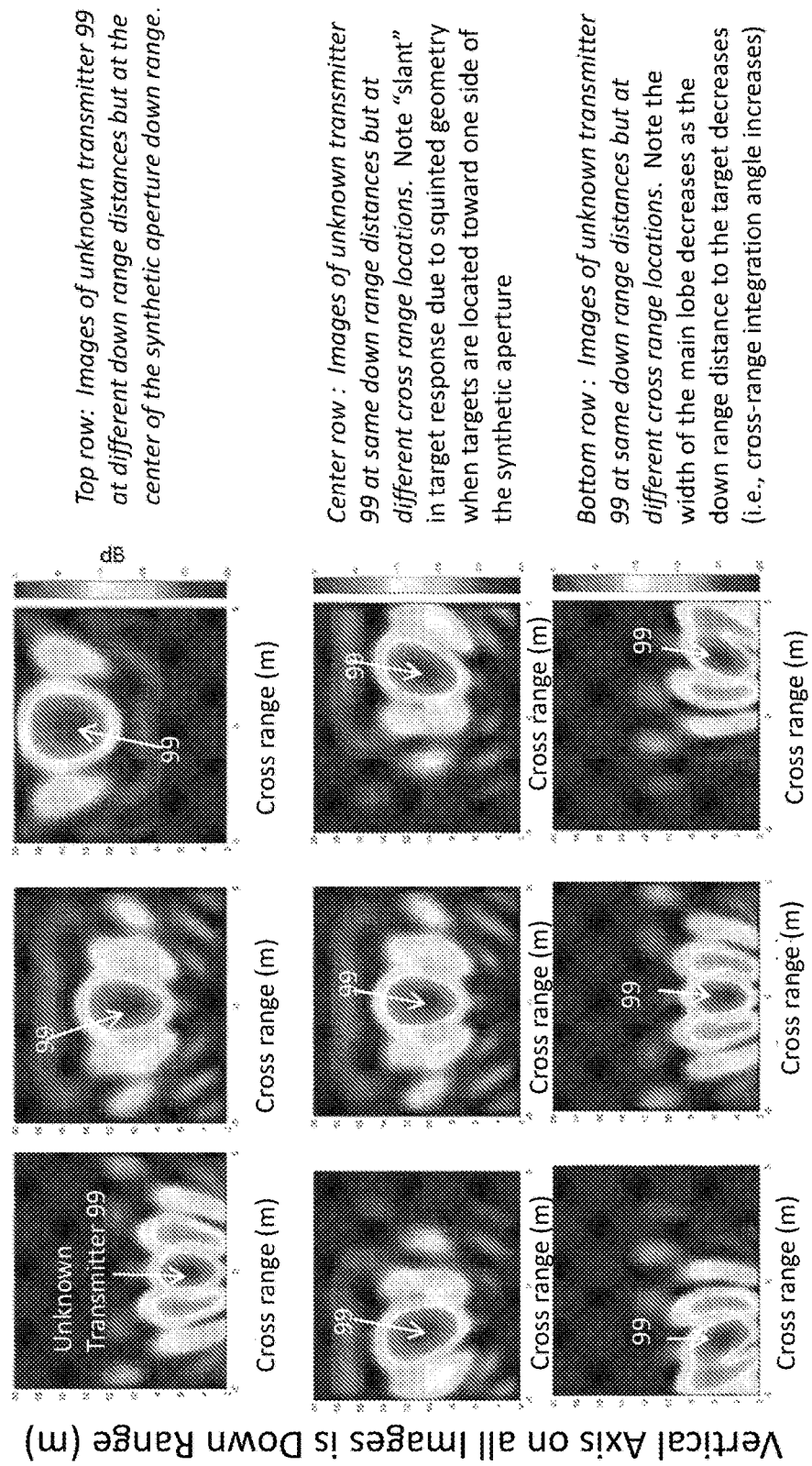
FIG. 8 Passive SAR images of target (unknown transmitter 99) at same or different cross range and down range locations. The same synthetic aperture length (20m) is used for all ranges.
Bandwidth: 62MHz ; Aperture length: 20m; Aperture element spacing: 0.1m; sample spacing: dT=1/750e6; total sampling interval (seconds): T=0.00025

METHOD AND APPARATUS FOR PROVIDING A PASSIVE TRANSMITTER BASED SYNTHETIC APERTURE RADAR

CROSS-REFERENCE TO RELATED APPLICATIONS

This application is a continuation-in-part of co-pending U.S. patent application Ser. No. 15/671,579, filed 8 Aug. 2017, which is herein incorporated by reference in its entirety.

GOVERNMENT INTEREST

The embodiments herein may be manufactured, used, and/or licensed by or for the United States Government without the payment of royalties thereon.

BACKGROUND OF THE INVENTION

In the current state of operations, occasions arise such that threats (or targets) must be detected at a standoff distance. Some threats contain components whose permittivity contrasts substantially with that of the emplacement; such is the case with many threats that are buried. The reception of a subsurface linear radar response from an area whose surface is otherwise undisturbed indicates the presence of a threat. Other threats contain metal contacts and semiconductor junctions whose nonlinear electromagnetic response contrasts with that of the emplacement; such is the case with radio frequency (RF) electronics. The reception of a nonlinear radar response from an area that does not otherwise contain electronics indicates the presence of another class of threat. Often, threats contain dielectric, as well as electronic components, hence they will respond to both linear and nonlinear excitation and either linear or nonlinear radar with detect such as threat. Hence, there exists a need to detect both types of threats, whether or not they are collocated using a single assembly or unit.

In the publication by D. Young, et al., entitled "Ultra-Wideband (UWB) Transmitter Location Using Time Difference of Arrival (TDOA) Techniques," Conference Record of the 37th Asilomar Conference on Signals, Systems and Computers, (2004), 1225-1229 Vol. 2, DOI: 10.1109/ACSSC.2003.129218, techniques to determine the location of a transmitter are disclosed. In the publication by H. Leung and X. Liu, entitled "Resolution enhancement in passive SAR imaging using distributed multiband fusion," Proceedings of 2013 IEEE Antennas and Propagation Society International Symposium (APSURSI), 2013, 1026-1027, DOI: 10.1109/APS.2013.6711173 (hereinafter Leung), the usage of synthetic aperture radar imaging using multiband fusion is disclosed. According to the Leung abstract, using multiple emitters, a 'fusion-before-imaging' method for passive synthetic aperture radar (SAR) imaging is utilized to effectively fuse target signature data from multiple receivers in order to achieve a synthesized target reflectivity with a broader bandwidth coverage. The Leung method jointly compensates the phase offsets among sub-band signals due to geographically varied bistatic radar configurations and estimates the missing spectral data to mitigate the image artifacts in conventional direct Fourier based imaging technique.

SUMMARY

Embodiments of the present invention are directed to a method and apparatus for receiving signals from an unknown transmitting source and providing the location of the unknown transmitting source. The apparatus comprises a series of channels for receiving signals radiated by the unknown transmitting sources, generating preprocessed time domain data and generating a SAR image depicting a location of the unknown transmitting source; and a processor for processing the preprocessed time domain data to enhance a pixel value at each pixel location within the SAR image by summing signal data from each channel related to each pixel location to generate an enhanced SAR image.

These and other embodiments will be described in further detail below with respect to the following figures.

Figure 1A:
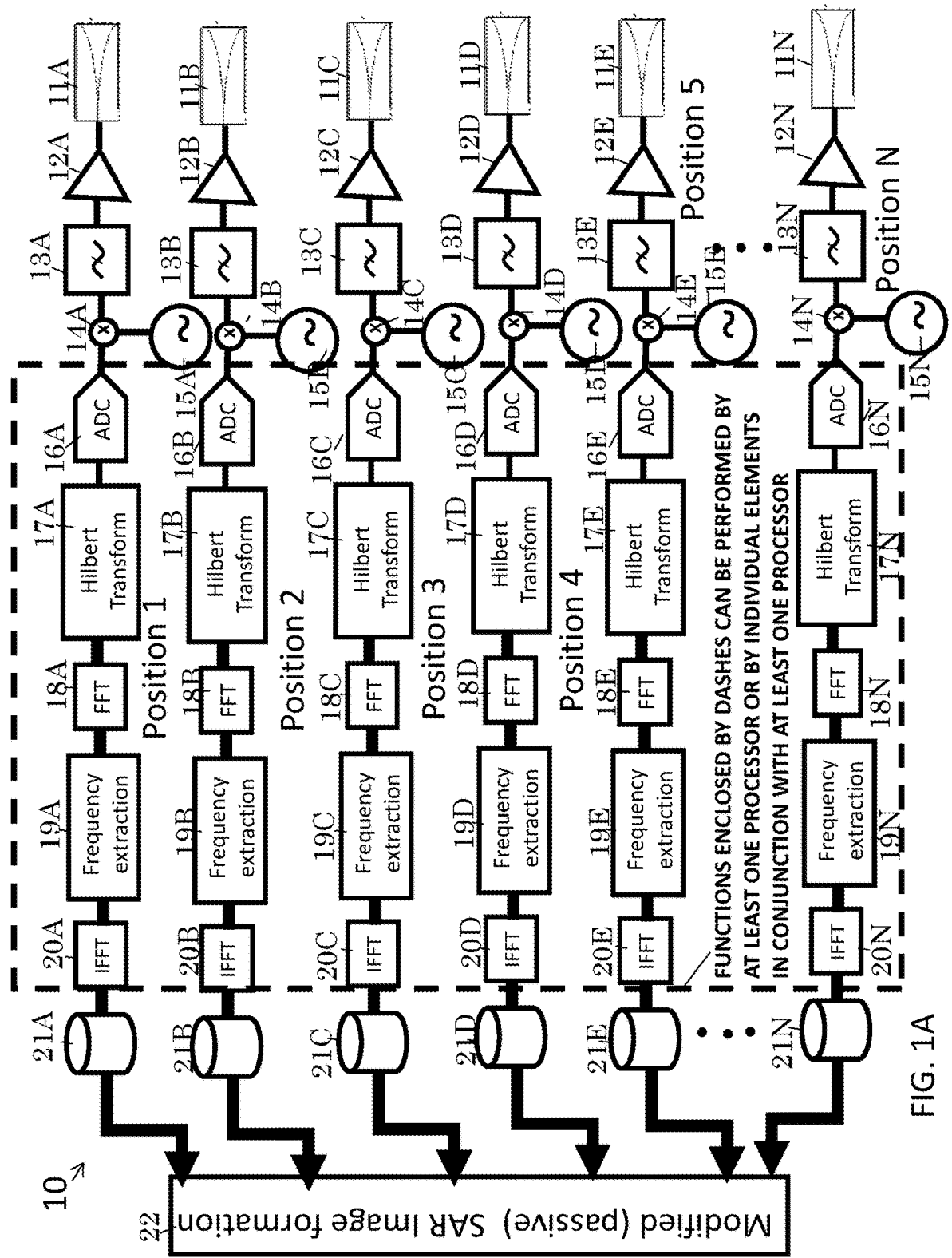
FIG. 1A is a schematic block diagram of an embodiment of the present invention. The operations enclosed by dashed lines can be performed using a computer or processor with appropriate software.

As to FIGS. 3A-3D, the plots therein were generated using measured data representative of actual system data. An available signal generator was leveraged to create a waveform with suitable bandwidth, and then the complex (I/Q) spectral data was recorded using a real time spectrum analyzer (RSA). The RSA enabled measurement of the spectrum over a bandwidth of approximately 100 MHz at a center frequency of 250 MHz. The "spikes" visible in the frequency domain plots (see plots in FIGS. 3B and 3C) are separated by 6 MHz, and they constituted the set of spectral lines selected for further processing.

FIG. 3A is an illustration showing a periodic signal in the raw (unprocessed) I-channel data.

FIG. 3B is an illustration showing the data of FIG. 3A transformed to the frequency domain via a 50000-point FFT, to produce elevated spectral lines above the noise floor.

FIG. 3C is an illustration showing samples extracted from discretely spaced locations at fixed intervals that are determined a priori. The samples may be extracted and zero-padded, thereby interpolating the signal in the time domain, as illustrated by plot shown in FIG. 3C.

FIG. 3D is an illustration of the periodic signal obtained following transformation to the time-domain, shown using a time scale (shown on x-axis) in meters. This scale is selected to emphasize the correlation between the parameters of the multi-tone, passive radar and similar parameters of the standard stepped-frequency, active radar. Note how the periodic signal of interest can be detected due to the extraction of appropriate frequency domain samples, as shown in the plot shown in FIG. 3D.

FIG. 4 is a schematic illustration showing a block diagram of an image formation subsystem of an embodiment of the present invention.

FIG. 5A is a schematic illustration depicting image formation using modified synthetic aperture radar (SAR) image formation.

FIG. 5B is a schematic illustration of image formation using synthetic aperture radar (SAR) image formation including multiple array locations that reflect an operational mode of the system.

FIG. 6A is an illustration showing the passive SAR data prior to image formation for a simulated transmitter at a specified down-range and cross-range location relative to the radar. Ambiguous range responses from the target are evident.

FIG. 6B is an illustration showing an example of range ambiguity after image formation.

FIG. 7A is an illustration showing time-domain data obtained by extracting signals at fixed frequency intervals throwing away zero-frequency bins, and NOT zero-padding in any way. The sequence contains only 31 elements.

FIG. 7B is an illustration showing a portion of the resulting time-domain obtained by extracting data at fixed frequency intervals, retaining small frequency bins and zero-padding. The sequence repeats many times. The sequence length is 500650 elements following interpolation (zero-padding). The x-axis is shown in meters (similar to the plot of FIG. 7A).

FIG. 7C is an illustration showing the data of FIG. 7B in a dashed box and additional data.

FIG. 8 is an illustration showing passive SAR images of a target at different cross range and down range locations.

Figure 9:
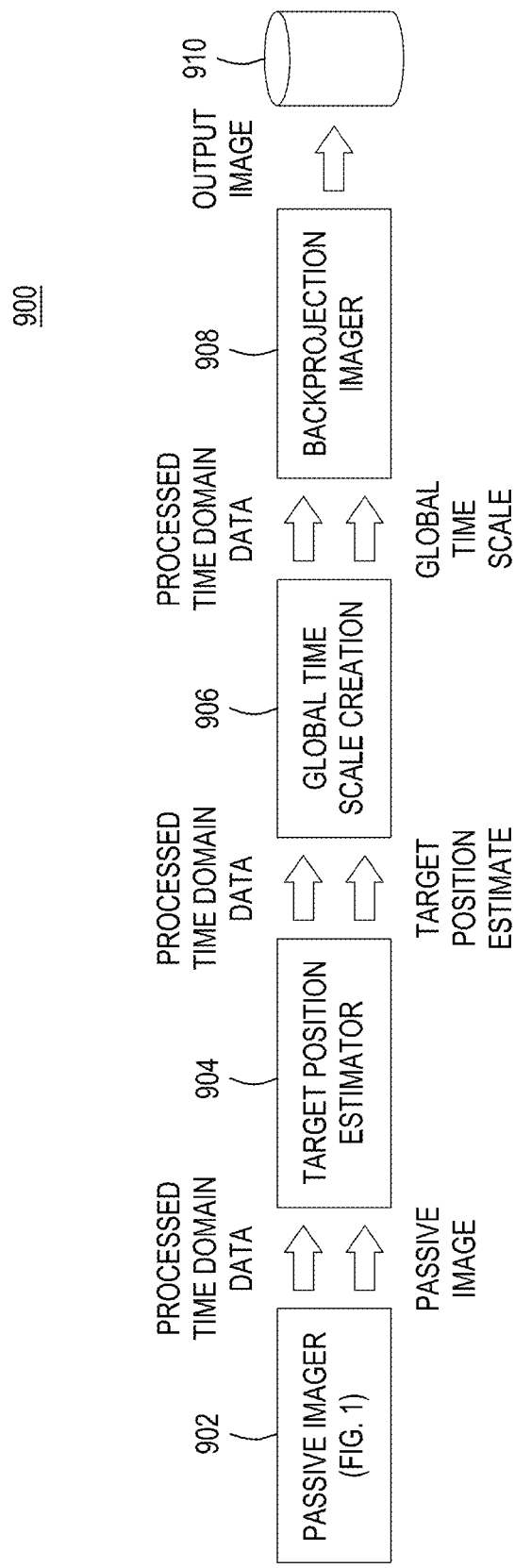

FIG. 9 is a block diagram of another embodiment of the invention comprising an additional signal processing subsystem added to the system of FIG. 1.

Figure 10:
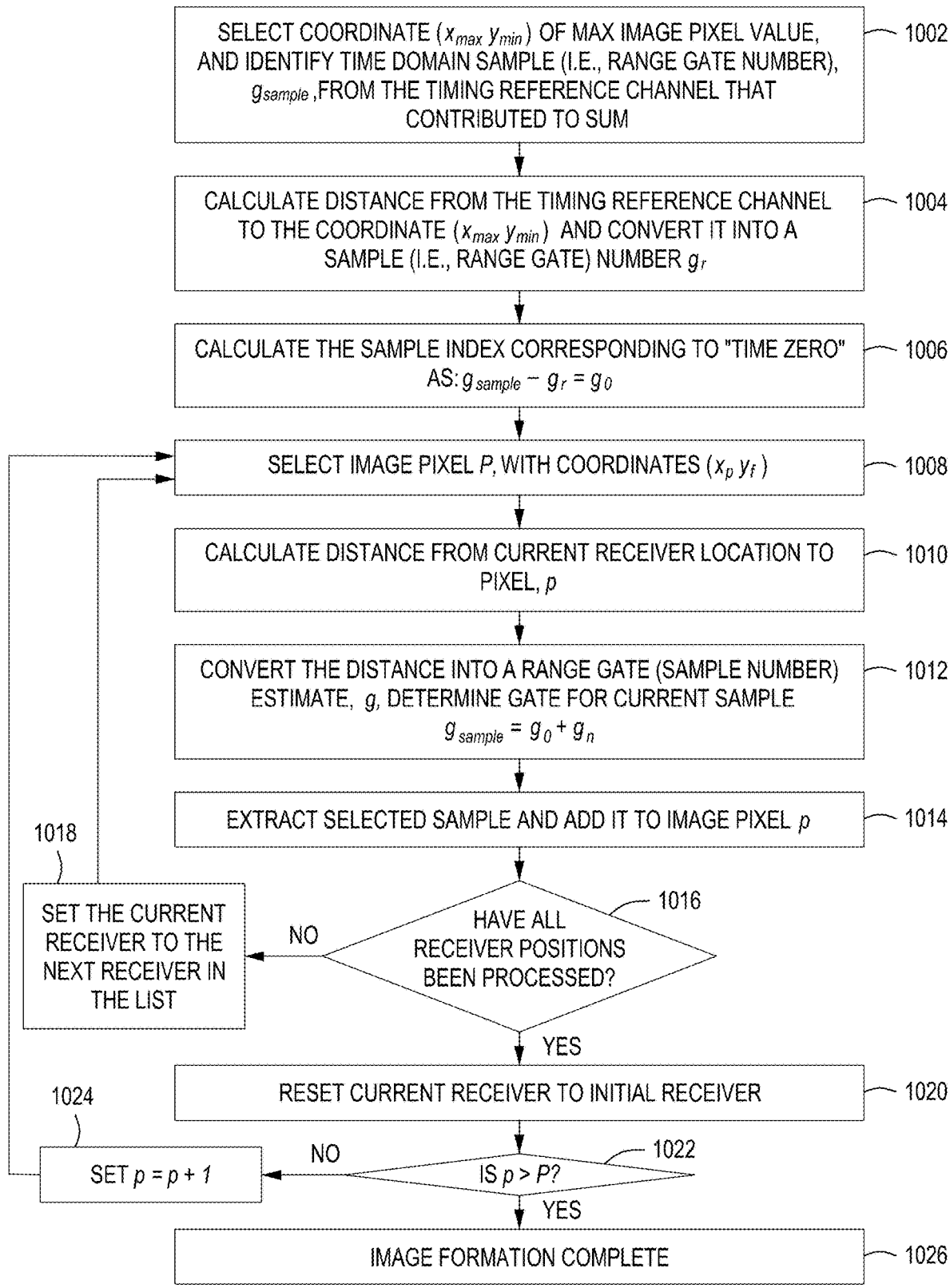

FIG. 10 is a flow chart of the operation of the embodiment of FIG. 9.

Figure 11:
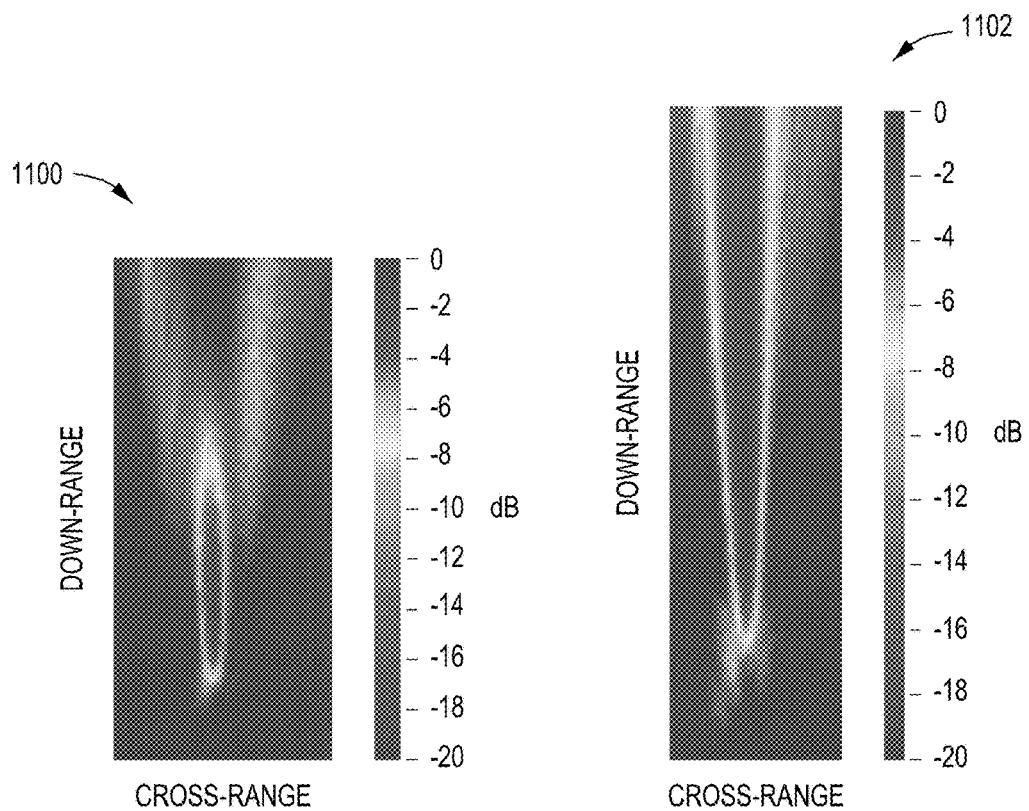

FIG. 11 depicts an output image of the first stage of the embodiment of FIG. 9.

Figure 12:
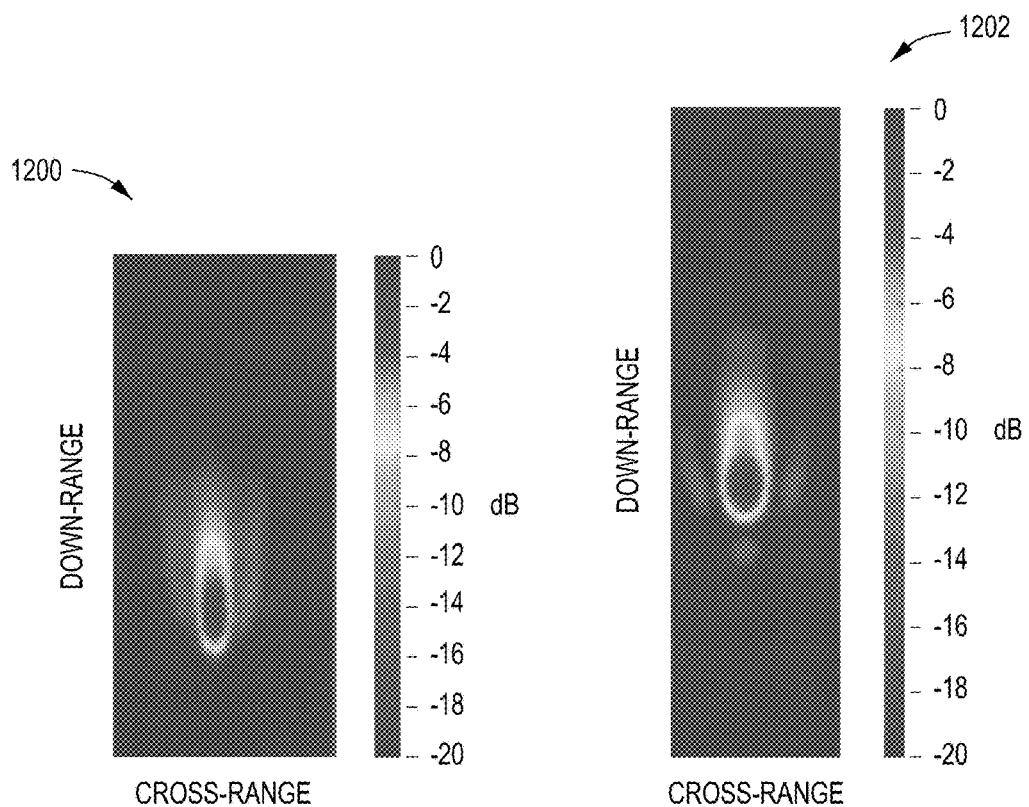

FIG. 12 depicts a final output image of the embodiment of FIG. 9 after the additional signal processing is performed.

A more complete appreciation of the invention will be readily obtained by reference to the following Detailed Description and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various ranges, elements, components, regions, layers and/or sections, these elements, components, regions, layers and/or sections should not be limited by these terms. For example, when referring first and second ranges, these terms are only used to distinguish one range from another range. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent.

As may be used herein, the term "significantly" means of a size and/or effect that is large or important enough to be noticed or have an important effect.

As used herein the terminology "substantially all" means for the most part; essentially all.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Embodiments of the present invention are described herein with reference to cross-section illustrations that are schematic illustrations of idealized embodiments of the present invention. As such, variations from the shapes of the elements in the illustrations are to be expected. Thus, embodiments of the present invention should not be construed as limited to the particular shapes of regions illustrated herein but are to include deviations in shapes. Thus, the layers or regions illustrated in the figures are schematic in nature and their shapes are not intended to illustrate the precise shape of a layer or region of a device and are not intended to limit the scope of the present invention.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Classical active radar systems transmit a specific waveform and measure the time elapsed between transmission and reception of that waveform. Passive radar systems exploit a "non-cooperative" transmitter and measures the difference in travel time between the direct path and the reflected path. In each case a transmitter is required, and this transmitter is likely separated from the area under surveillance by a relatively large distance. According to Wikipedia, the term "RADAR" was coined in 1940 by the United States Navy as an acronym for RAdio Detection And Ranging or Radio Direction And Ranging. Note that this definition does not prohibit a transmitter from itself being the object that is to be detected and located. Hence, we often use the term "radar" when referring to the present invention.

Embodiments of the present invention are directed to a system for passively detecting and locating transmitters through novel analysis and processing of their periodic signals. It differs from current systems in that it exploits the inherent bandwidth of transmissions collected at multiple locations to provide a two-dimensional estimate of the target location (i.e., an image with resolution in both downrange and cross-range). An embodiment of the present invention may process multiple transmitted frequencies using a modified "synthetic aperture radar" (SAR) system comprising a receiver and processor. For purposes of this discussion, initial processing (in down-range and cross-range) is illustrated using radio frequency (RF) data—both measured and simulated. The concept of the present invention is based on the premise that many transmitted signals are not pure sinusoids, and as a result, their spectra include modulation of fundamental frequency (single tone, one frequency). If the signal spectrum spans a wide enough band, then specific frequency sub-bands (fast Fourier transform (FFT) bins) can be selected and used to create a "frequency-sampled" version of part of the signal spectrum. By restricting attention to specific discretely spaced subbands, which are known a priori to be favorable, it is possible to construct a "clean" pulse train due to the transmitter of interest. If several pulse trains are coherently measured over a large synthetic aperture, it then becomes possible to determine the target position relative to that aperture.

A long FFT may be used to convert recorded time-domain data to the frequency domain, increasing SNR and facilitating extraction of specific frequency-domain samples. By converting the extracted spectral data back to the time domain, a "cleaned" pulse train is obtained. The location of the pulses in this train follows a specific "trajectory" in the plane comprising the downrange signatures recorded at each aperture position. The shape of this trajectory is dictated by the target location within the scene, and the image formation algorithm essentially determines the image pixel corresponding to this location.

The techniques of the present invention may be applicable to signals from transmitters, such as digital TV (DVB-T, or "Digital Video Broadcast-Terrestrial"). Certain DVB-T signaling formats do incorporate pilot tones that may be appropriate for exploitation. At the current time, however, DVB-T signals have not been analyzed to determine whether or not the pilot tones exhibit the appropriate phase relationships. Digital Audio broadcast channels also use a similar coding scheme; although their bandwidth is so small that the achievable resolution would be extremely poor. Wi-fi devices and/or cell phones may very well use a similar signaling strategy. In the following discussion, the terminology "regularly spaced samples within a specified frequency band" encompasses the foregoing signals.

Some current passive, transmitter-location systems exploit the magnitudes of measured transmissions to detect and/or identify particular transmitters. Other systems exploit sensor motion and user expertise to locate extremely narrowband (i.e., essentially a single frequency) transmitters. In order to locate these targets in range, however, the detector must determine the spatial location corresponding to the strongest measured signal. That is, the sensor must move toward the transmitter. Because the present invention exploits both magnitude and phase information, it is able not only to detect but also to locate a particular transmitter without the need for an elaborate sensor trajectory. A side-looking SAR sensor configuration may be used to provide geo-location capability at standoff. Additional filtering of the spectrum samples and additional coherent integration (by a SAR processor) should also enable the proposed system to increase its output signal-to-noise ratio.

An embodiment of the present invention utilizes synthetic aperture radar (SAR) processors to process wide-bandwidth signals over large azimuth angles (long apertures) to obtain imagery with high resolution in both the along-track and cross-track dimensions. By tracking measured phases at all frequencies and aperture positions, significant gains in signal-to-noise ratio are realized.

An embodiment of the present invention, which differs fundamentally from both the traditional active and passive radar systems, leverages geolocation concepts common to traditional radars (and communications systems), but does not transmit. One embodiment detects and geolocates transmitters that are within an area under surveillance. By considering waveforms transmitted by these devices, the embodiment is able to obtain bandwidth and create "SAR-like" images of the transmitters within the scene. Since it may be the only object within the scene producing the desired signal, direct-path clutter is not a concern. Only multi-path clutter should pose a potential problem.

FIG. 1A is a schematic diagram of an embodiment system of the present invention. A plurality of receiving antennas 11A-11N are positioned to receive signals transmitted by an unknown transmission source; i.e. a potential target. One realization of the system uses the L-Com HyperLink HG72710LP-NF Wideband Log Periodic Antenna, which has a gain of 10 dBi. Although channels or positions A through E and N are shown, any number of receiving antennas are contemplated as being within the scope of the present invention and the channels or positions that are shown are intended for illustrative purposes only. The components enclosed by the dashed line may be performed using at least one computer or processor programmed with the appropriate code.

In the receiver 10, signals are received by a receiving antennas 11A-11N. The received signal is then passed through amplifiers 12A-12N to low-pass filters 13A-N to eliminate higher-frequency data that is not of interest. The received signal is mixed via mixers 14A-N driven by sine wave generators 15A-15N. The signal is then digitized, via digitizers 16A-N, before being subjected to a Hilbert transform represented by boxes 17A-17N to create real and imaginary signal components. Performing a Hilbert transform enables manipulation of the signal after it has passed through the A/D converter by creating a single-sideband signal. The invention is not limited to the Hilbert transform procedure since having in-phase and quadrature channels on the initial mixer will accomplish the same thing. As a result of the Hilbert transform procedure, interpolating via the Fast Fourier transform (FFT) becomes straight forward using a single-sideband. Performing a Fast Fourier Transform or the Fourier Transform, is represented by boxes (processors) 18A-N. In general, the output of the FFT will be a complex signal. If the input signal is real and symmetric about the origin, where the first sample represents "time equals zero" (i.e. the value of the second sample is equal the value of the last sample, the value of the third sample is equal to the value of the second-to-last sample, etc.), then the input signal is said to be even, and its FFT is real; however, this is a special situation. Boxes 19A-N represent the frequency extraction and filtering process performed by selecting samples from pre-specified frequency bins following the FFT depicted in FIG. 18 and, as represented by boxes 20A-20N, subsequently performing an inverse Fast Fourier Transform and storing the time-domain data in memory 21A-21N for use in the modified SAR image transformation represented by box 22. FIG. 4 is a block diagram depicting the elements of the modified SAR image transformation represented by box 22.

Figure 1B:
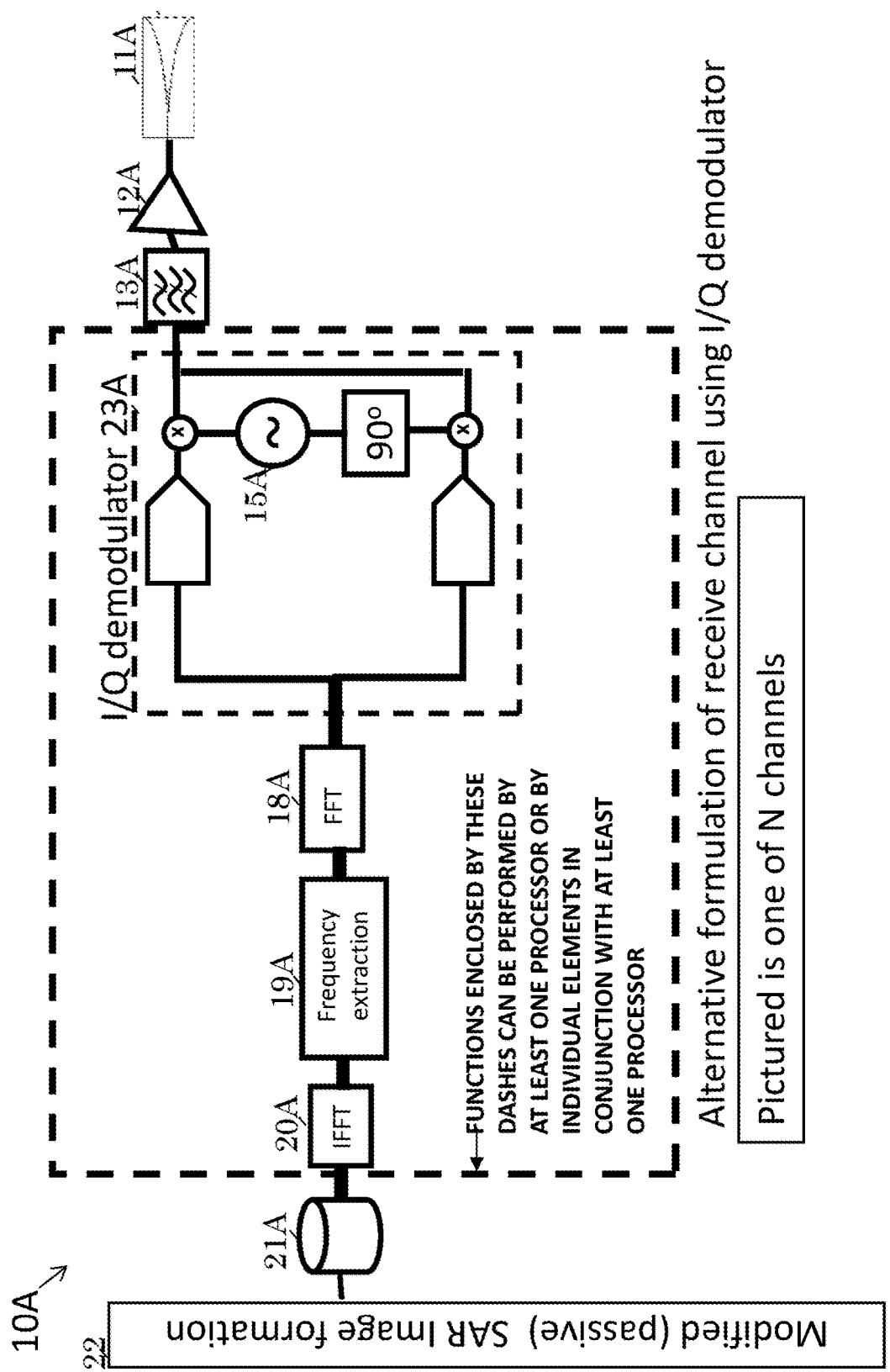
FIG. 1B is an alternative formulation of receive channel using I/Q demodulator.

FIG. 1B is an alternative formulation of receive channel using an In-phase/Quadrature (I/Q) demodulator 23A. A signal 90 degrees out-of-phase is generated from the signal generator 15A and combined prior to the Fast Fourier Transform operation (Box 18A). All numbered elements in FIG. 1B are the same as those same numbered elements of FIG. 1A and the remaining channels 2-N, although not shown, form part of the embodiment shown in FIG. 1B in a manner substantially the same as those shown in FIG. 1A.

The receiver 10 may be implemented as machine-executable or computer-executable-instruction (e.g., software code) executed by a computer processing module, which is comprised of memory module(s) and one or more processor(s) (or micro-processors) as known in the art that are configurable to execute the novel processing methodology. Instructions, such as software code, firmware, or the like, may be stored on a computer or machine-readable storage media having computer or machine-executable instructions executable by the processor(s) configured them for executing of the processor(s). Processor-executable instructions can be stored in a non-volatile memory device and executed by the processor(s) when needed. Filter processing and combination matched filter processing with sidelobe reduction processing may be implemented using processor-executable instructions. The specifics of this processing is described below).

In some implementations, the processor(s) may be a programmable processor, such as, for example, a field-programmable gate array (FPGA) or an application-specific integrated circuit (ASIC) processor. The methodology disclosed herein may be implemented and executed by an application that may be created using any number of programming languages.

An embodiment of invention has been verified using measured data and Mathworks® Matlab code. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting. The methodology disclosed herein may be implemented and executed by an application may be created using any number of programming languages.

Alternatively, embodiments of the above components could be implemented as hardware (e.g., electrical circuit) using delay lines, stored replicas of the waveform (e.g. an arbitrary waveform generator), etc. The key point of this disclosure, however, is the processing methodology. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Figure 2:
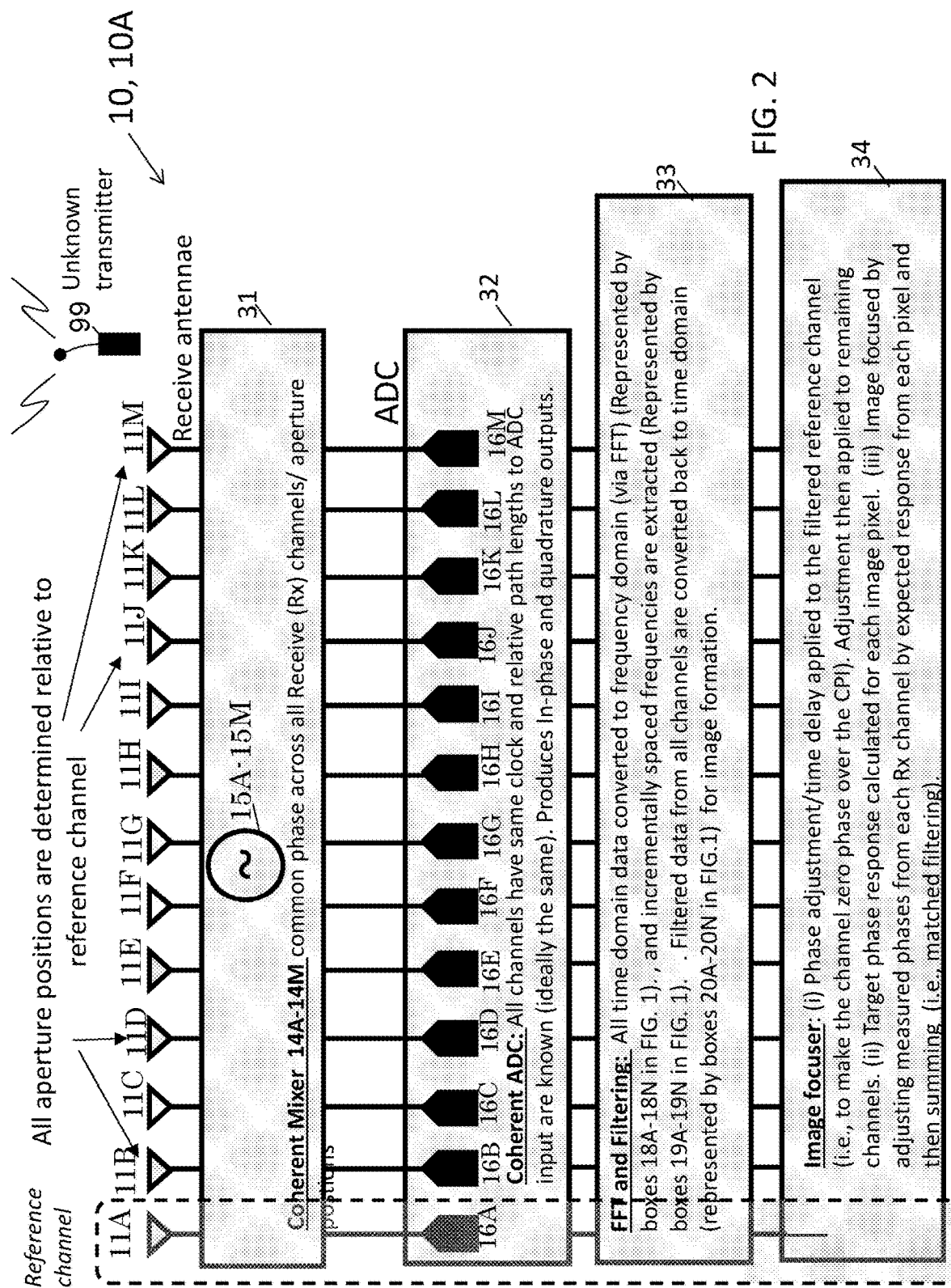
FIG. 2 is an illustration showing a flow chart of the embodiment system 10, 10A of FIGS. 1A and 1B.

FIG. 2 is an illustration showing a flow chart that may be implemented using the embodiment system 10 of FIG. 1A or 10A of FIG. 1B. The signal from an unknown transmitting device 99 is received over N channels, which could represent either physical array elements or synthetic aperture radar positions. If the signal is down-converted (to reduce the sampling requirements of the analog-to-digital converters (ADCs)), then the phase of the reference sinusoid must be the same in each of the receive channels. (See box 31.) This stipulation is necessary because non-uniform phase would introduce differences between the measured target signal and the "matched filter" used for image formation. This, in turn, would cause the passive SAR target to defocus and lose processing gain. Note that phase variations due to differences in signal propagation path lengths could be "calibrated out" provided that they are constant across an entire coherent processing interval (CPI) and could be measured prior to each CPI. Since such phase differences should remain constant throughout system operation, such a calibration step should be easy to implement. In practice, one of the end receive channels is designated as the "reference channel," and all of the time shifts (phase corrections) required by the image formation algorithm (the time-domain back projection algorithm) are calculated relative to this channel.

Box 32 in FIG. 2 represents a series of analog-to-digital converters (ADCs) 16A-16M used to sample the input data stream in each channel. These ADCs 16A-16M use a common clock, allowing the input signals to be sampled at the same time in all of the Rx channels. If simultaneous sampling is not achievable (due to different processing delays in various channels), then it is assumed that any system delays causing these differences can be identified, as noted above. The ADCs 16A-16M also produce both in-phase and quadrature (I/Q) outputs, which are convenient for downstream FFT processing (represented by boxes 18A-18N in FIGS. 1A, 1B).

The complex data samples from box 32 are then transformed into the frequency domain via an FFT (represented by boxes 18A-18N in FIGS. 1A, 1B) as depicted in box 33 of FIG. 2. The desired frequency sub-bands for detection purposes (known a priori) are retained while other frequency domain samples are set to zero. By transforming the frequency domain samples back into the time domain represented by boxes 20A-20N in FIGS. 1A, 1B), a "cleaner" time domain signal is obtained suitable for additional processing. Finally, the multi-tone, complex signal is input to an enhanced back projection image formation algorithm as indicated by box 34.

According to Wikipedia, the Back Projection Algorithm is described in Dudgeon and Mersereau "Multidimensional digital signal processing," Prentice-Hall (1984), herein incorporated by reference. In practice of tomographic image reconstruction, a stabilized and discretized version of the inverse Radon transform may be used, known as the filtered back projection algorithm. According to Wikipedia, the name back-projection comes from the fact that 1D projection needs to be filtered by 1D Radon kernel (back-projected) in order to obtain a 2D signal. An example of back-projection equations for an active system are included below:

$$P(i) = \sum_{k=1}^{K} w_k s_k(f(i,k)), 1 \le i \le N,$$

where $w_k$ is a weight factor, $s_k$ is the measured signal at aperture position k, f(i,k) is the delay to pixel i from aperture position k, and N is the number of pixels in image P. See in this regard L. Nguyen, "Signal and Image Processing Algorithms for the U.S. Army Research Laboratory Ultra-wideband (UWB) Synchronous Impulse Reconstruction (SIRE) Radar," Army Research Laboratory Technical Report, ARL-TR-4784, pp. 27-29, herein incorporated by reference in its entirety.

This specialized focuser is formulated to operate on signals measured by a passive system, which is not able to create its own time reference. Fortunately, timing information for the passive SAR is available from the signal created from the various sub-bands extracted from the target signal.

Examples of waveforms at various stages of the processing chain are depicted in FIGS. 3A-3D, demonstrating how it is possible to generate useful timing information from the transmitted signals. The plots in FIGS. 3A-3D were generated using measured data. An available signal generator was leveraged to create a waveform with suitable bandwidth, and then the complex (I/Q) spectral data was recorded using a real time spectrum analyzer (RSA). The RSA enabled measurement of the spectrum over a bandwidth of approximately 100 MHz at a center frequency of 250 MHz. The "spikes" visible in the frequency domain plots (see plots in FIGS. 3B and 3C) are separated by 6 MHz, and they constituted the set of spectral lines emitted by the unknown transmitter 99 selected for further processing.

The plot shown in FIG. 3A demonstrates how it is impossible to discern any sort of periodic signal in the raw (unprocessed) I-channel data. By transforming into the frequency domain via a 50000-point FFT, one is able to elevate the spectral lines above the noise floor, as shown in by the plot in FIG. 3B. Since the locations of the desired spectrum samples are at fixed intervals that are determined a priori, samples can be extracted and zero-pad, thereby interpolating the signal in the time domain, as illustrated by plot shown in FIG. 3C. Upon transforming back into the time domain, the periodic signal can be detected due to the extracted frequency domain samples, as shown in the plot shown in FIG. 3D. FIG. 3D illustrates the time scale (x-axis) in meters to emphasize how well parameters of the multi-tone, passive radar correlate with similar parameters of the standard stepped-frequency, active radar. The pulse repetition interval is slightly less than 50 m, which corresponds to the one-way unambiguous range for a stepped frequency radar with a step or fixed interval size of 6 MHz. In addition, the main peak width (3 dB-down point) is roughly the 3 m corresponding to the one-way resolution of a stepped-frequency radar with a 100 MHz bandwidth.

FIG. 4 is a schematic illustration showing a block diagram of a modified SAR image transformation subsystem of an embodiment of the present invention, which may be performed using a computer, processor or the like. Specifically, in box 40, the image pixel is specified. In box 41, a reference pulse in both the reference and current channels is selected from the pulse train depicted in FIG. 3D. In Box 42A, a reference channel distance estimate is determined. In Box 42B, the current channel distance estimate is determined. In Box 43, an estimation of the difference in range to the specified image pixel between the current and reference channels is determined. In Box 44, the selection of a (complex) time-domain sample from the current channel is performed based on the range difference estimate. In Box 45, the sample is added to the final (integrated) image pixel. This process is repeated for all image pixels and all aperture locations. It is noted here that this modified image formation system differs fundamentally from currently fielded active systems. This is due to the fact that all range and phase measurements are relative, which, in turn, follows from the fact that the global timing scale provided by a transmitted pulse is not available.

FIG. 5A is a schematic illustration showing a representation of the process described by the block diagram of FIG. 4. In FIG. 5A the aperture positions (channels) are depicted by the circles, and the output image is depicted by the indicated grid 51. Each channel (aperture position) contributes a sample to the sum constituting each output image pixel. FIG. 5A illustrates an example utilizing the basic concept of the back projection imaging algorithm. The radar may be mounted on a moving or stationary platform. It receives signals from the area. Using the motion of the platform, the radar collects K data records along its path (or aperture). In general, the aperture could be a line, a curve, a circle, or any arbitrary shape. The receiving element k from the aperture is located at the coordinate $(x_p(j), y_p(j), z_p(j))$. In order to form an image from the area of interest, an imaging grid 51 is formed that consists of N image pixels. Each pixel $P_i$ from the imaging grid is located at coordinate $(x_p(j), y_p(j), z_p(j))$. The imaging grid is usually defined as a 2-D rectangular shape. The back projection value at pixel P(i) is $$P(j) = \sum_{k=1}^{K} w_k s_k'(f(j,k)), \ 1 \le j \le M \quad (1)$$

where $w_k$ is the weight factor and $f(j,k)$ is the delay index to $s_k'(t)$ necessary to coherently integrate the value for pixel P(i) from the measured data at receiving element k.

The distance between the receiving element and the image pixel P(i) is $$d_2(i,k) = \sqrt{[(x_R(k)-x_P(i))]^2 + [(y_R(k)-y_P(i))]^2 + [(z_R(k)-z_P(i))]^2} \quad (2)$$

The total distance is $$d(i,k) = d_2(i,k) \quad (3)$$

The delay index is $$f(i,k) = \frac{d(i,k)}{c}$$

FIG. 5B illustrates a typical imaging geometry for a forward looking passive system. In this case, the radar is configured in forward-looking mode as illustrated in FIG. 5A. In this forward-looking mode, the system travels and receives energy in the same direction. The general back projection algorithm described above applies to the embodiment of FIG. 5B. As seen in FIG. 5B, the system travels in parallel to the x-axis.

Angular resolution is determined by the size of the receiving antenna array 11A-11M and the synthetic aperture generated by the channel selection. At a given range, the ability to resolve targets in the cross-range direction is known as the cross-range resolution. Similarly, the ability to resolve targets in the down-range direction is known as down-range resolution.

Each receiving antenna 11A-11M feeds its own receiving channel as shown in FIG. 2, and functions in effect as a digitizing system. To that end, each receiving antenna feeds an analog signal or data to each receiver channel which in turn converts or processes the analog data or signal in digitized form. The digitized data generated from each receiver channel is combined by processor or computer as referenced in FIG. 4, which then performs data processing tasks on the digitized signal (e.g., removal of interference from the digitized back projection signal, motion compensation (if any), filtering, and forming SAR imagery) using known image processing techniques, similar to those outlined in "Signal and Image Processing Algorithms for the Army Research Lab Ultra-Wideband Synchronous Impulse Reconstruction (UWB SIRE) Radar," Army Research Laboratory Technical Report, ARL-TR-4784, (2009), by Lam Nguyen, which is incorporated herein by reference.

Examples of the processor may include but are not limited to a central processing unit (CPU) or laptop computer. After image processing, a SAR image is generated. The 2-D SAR images that are formed by a processor are formed on the imaging grid 51 and are then sent to the display. The present invention is directed to a passive system; i.e., the system receives signals without transmitting. Further details for an active system are disclosed in U.S. Pat. No. 9,075,129, by Lam H, Nguyen, et al, entitled Method and System for Forming Images by Comparing Subsets of Image Data,", issued Jul. 7, 2015, U.S. Pat. No. 8,624,773, by Nguyen et al entitled "Multidirectional Target Detecting System and Method," issued Jan. 7, 2014, and U.S. Pat. No. 8,824,544, by Nguyen, et al, entitled Method and System for Recovery of Missing Spectral Band Information in Wideband Signal," issued Sep. 2, 2014, all of which are herein incorporated by reference in its entirety.

FIG. 6A is an illustration showing an image of a simulated target response from all aperture positions. Distances are relative and the ambiguous target responses are evident, separated by 150 m. The coherent processing interval (CPI) corresponds to the collection of all cross-range samples (i.e., 0 m to 20 m in relative cross range). Only a portion of a simulated, idealized target response as measured by a hypothetical linear receive array (or synthetic aperture) is included in FIG. 6A. Here the simulated target is 5 m away from the center of a 20 m aperture. Note that the target is assumed to be in free space; so there is no multipath. In addition, the spacing of the extracted spectral lines is 2 MHz, resulting in an unambiguous range of 150 m. The target trajectory is evident, and it is replicated at multiples of the unambiguous range (every 150 m). It is this characteristic target trajectory that is exploited by the back projection (matched filtering) image formation routine.

FIG. 6B is an illustration of a passive SAR image of a simulated target at a different down range location than the simulated target of FIG. 6A. The simulated aperture is, once again, 20 m; the simulated bandwidth is 186 MHz, the simulated frequency step size is 6 MHz, and the simulated aperture positions are separated by 0.1 m. As part of the image formation, all phases are adjusted relative to channel 1, which is set to zero phase at the beginning of CPI. Data from all aperture positions are integrated to produce each image pixel value.

The output SAR images displayed in FIG. 6B are then presented to an operator using a suitable display device, such as a computer screen. Points of interest can be indicated by overlaying symbols at locations where the image pixel values exceed a pre-determined level. In addition, outputs of automatic target detection algorithms, calculated using the system output imagery, can be displayed in a similar manner.

FIG. 6B is also an illustration showing an example of range ambiguity after image formation. Note that the ambiguous target response does not focus properly.

FIG. 7A is an illustration showing time-domain data obtained by extracting signals at fixed frequency intervals throwing away zero-frequency bins, and NOT zero-padding in any way. The sequence contains only 31 elements. FIG. 7B is an illustration showing a portion of the result obtained by extracting data at fixed frequency intervals, retaining small frequency bins and zero-padding. The sequence repeats many times, and the sequence length is 500650 elements. The x-axis of both units is shown in meters, and the "smoothed" nature of the interpolated plot is evident. FIG. 7C is an illustration showing a "zoom-out" of the plot in FIG. 7B.

FIG. 8 is an illustration showing output imagery for a target at different down-range and cross-range locations. The top row shows the output SAR images for the case where the transmitter is located at the center of the aperture at different down-range locations. The center row shows the output SAR images for the case where the transmitter is located at the same down-range location (i.e., approximately 11 m from the receiver array) but at different cross-range locations. The bottom row shows the output SAR images for the case where the transmitter is located at the same down-range location (i.e., approximately 5 m from the receiver array) but at different cross-range locations. Note how the cross range resolution (i.e., width of the target "blob") changes as a function of cross-range integration angle (i.e., decreasing as range increases). Also note how the shape of target response changes as a function of its offset from the array center.

The foregoing embodiment passively creates SAR-like images of transmitters within a scene. FIG. 9 depicts a block diagram of an enhanced embodiment (system 900) of the invention in which additional signal processing is applied to the output of the system of FIG. 1. In FIG. 9, the system of FIG. 1 is depicted as box 902 which feeds its output (preprocessed time domain data) to a series of processes represented by boxes 904, 906 and 908. The final output image is stored in digital storage 910.

As described with respect to FIG. 1, the receiver 10 comprises N channels (each a receiver unto itself coupled to an individual antenna). As such, the preprocessed time domain data is available from memory 21A-21N. Using both the preprocessed time domain data and a passive image, the processes of boxes 904, 906 and 908 enhance the image to produce a SAR-like image with improved resolution and overall improved image quality.

The process step performed in box 904 extracts the coordinates of the pixel exhibiting the maximum complex magnitude, where the complex magnitude of x is calculated as:

$$\|x\| = \sqrt{Re\{x\}^2 + Im\{x\}^2} = \sqrt{x_{inphase}^2 + x_{quadrature}^2}$$

Here, the customary in-phase and quadrature measurements are as described above in connection with the embodiment of FIG. 1. The maximum complex magnitude identifies the brightest pixel in the image. The brightest pixel is used as a reference point for processing the preprocessed time domain data.

Following the determination of these target reference coordinates, the process of box 904 recalculates the mapping between the time domain sample number and the output image pixel coordinate to obtain a target position estimate. The embodiment may also use the mapping calculated by box 902 without remapping the target position. This calculation is made for a selected receive antenna (denoted the "reference channel") and the calculated index (sample number) is designated $g_{sample}$. After $g_{sample}$ has been determined, the process of box 906 calculates the sample number (range gate number) corresponding to the one-way distance from the reference channel to the maximum-value image pixel, where "one-way distance" denoted the distance from the target to the reference channel. The range gate number is recorded as gr. Following the determination of $g_{sample}$ and $g_T$, box 906 calculates the sample number corresponding to "zero time", or the location of the receiver, defined as: $g_{sample} - g_T = g_0$. After determining these parameters, the sample number (range gate) corresponding to any image pixel can be determined via the formula $g_{sample,p,m} = g_0 + g_{p,m}$, where $g_{p,m}$ is the range gate corresponding to the one-way distance from pixel p to receiver m. This computation produces a global time scale to which all samples are referred. The process in box 908 uses the global time scale and the preprocessed time domain data in a back projection image process (described in relation to FIG. 1 above) to create the SAR image.

FIG. 10 depicts a flow chart 1000 of the signal processing that is performed in boxes 904, 906 and 908 of FIG. 9. Boxes 1002, 1004 and 1006 compute $g_{sample}$, $g_T$ and $g_0$ as described above (e.g., determine the brightest pixel, determine the range gate value, calculate the sample index corresponding to time zero). The process of box 904 exploits the information from boxes 1002, 1004, and 1006. Note that the preprocessed time domain data used for image formation is, in general, complex. While magnitude-only data could also be used, generally, the output of the initial image formation stage (box 902) is not of high-enough quality to enable effective implementation of the second image formation step (box 908 of FIG. 9).

Two nested loops operate together to process the preprocessed time domain data. The inner loop selects a pixel (box 1008), then processes data across all channels relating to that pixel. Specifically, the inner loop sums all the data from each channel as a value at the currently selected pixel. As such, box 1010 calculates the distance from the current channel to the selected pixel, then box 1012 converts the distance into a range gate estimate for the current pixel. At box 1014, the inner loop extracts a selected sample from memory and adds the sample value to the value of the pixel. The query at box 1016 asks if all the channels have been processed. If the query is negatively answered, the process continues to box 1018 and selects the next channel for which data will be process for the currently selected pixel. If the query at box 1016 is affirmatively answered, the process moves to the outer loop at box 1020.

At box 1020, the current channel is reset to the initial channel. At box 1022, the method 1000 queries if all the pixels in the image have been processed. If the query is negatively answered, the outer loop proceeds to box 1024 to increment the pixel by 1 and enter the inner loop at step 1008. At this point, the next pixel is processed across all channels. If the query at box 1022 indicates all the pixels have been processed, the loops are exited, and the image formation is complete (box 1026) and the enhanced image is stored (storage 910 of FIG. 9).

In one embodiment of the resent invention, Recursive Sidelobe Minimization (RSM) is used to enhance image quality, as described, for example, in commonly assigned U.S. Pat. No. 9,250,323 and herein incorporated by reference in its entirety. Other embodiments may omit this processing step or may include other techniques known to practitioners of the art, such as apodization or spatially variant apodization.

FIG. 11 depicts an example output images 1100 and 1102 at two different ranges from the initial stage (box 902) of the enhanced system 900. This data was measured using a controlled test environment comprising a synthesized transmitter and a laboratory-grade receiver. While the target is localized (in both x- and y-coordinates), a large number of sidelobes (artifacts) are evident. Here, the image pixel values have been normalized to the maximum pixel value in the image, and the scaled values are displayed in a logarithmic (decibel, or dB) scale.

FIG. 12 depicts an example output images 1200 and 1202 at two different ranges from the final stage (box 908) of the enhanced system 900. These images are depicted at the same dynamic range as used in FIG. 11. As can be clearly seen in FIG. 12 as compared to FIG. 11, the target localization is superior from the enhanced system 900, and the number and severity of the sidelobes have been reduced such that a very accurate cross-range and down-range position for the target transmitter can be determined.

The proposed embodiments of the present invention differs from the current state of the art radar systems in that it is passive and it restricts attention to a particular target—RF transmitters. Since the proposed system utilizes signal bandwidth, it is able to obtain a range estimate without moving toward the target. That is, an "absolute" signal level (signal strength) measurement is not required to estimate range. This could be particularly useful when the system and transmitters of interest are close to the ground, and signal levels can vary dramatically due to the sensing geometries. By considering data from discretely spaced frequency intervals of a transmitted signal, the proposed system is able to incorporate a greater degree of flexibility: if a particular set of spectral lines are unavailable, then the system can process a different set. While current efforts are underway to develop cognitive active radar systems, the necessary modifications are more extensive, since both the transmitter and receiver must be able to adapt on-the-fly.

Embodiments of the present invention are directed to passively detecting and geolocating RF transmitters. Unlike current passive systems, it exploits the bandwidth produced by the targeted transmitters to provide down-range resolution. In addition, the present invention leverages diversity in the receive channel locations in a novel way to create a synthetic aperture, thereby realizing increased cross-range resolution. The invention could be used to surveil a secure region to ensure that specific transmitters are not present. It could also be used to locate personal equipped with a suitable transmitter. The present invention represents a novel extension of radar techniques to the problem of passively detecting and geolocating RF transmitters. Unlike current passive systems, it exploits the bandwidth produced by the targeted transmitters to provide down-range resolution. In addition, the current invention leverages diversity in the receive channel locations in a novel way to create a synthetic aperture, thereby realizing increased cross-range resolution.

Based at least in part on the fact that certain transmitted waveforms may include spectral content that could be used to estimate the location of the device that transmitted them, the present invention comprises a system for recording these spectrum samples and then processing them in a novel way to obtain an estimate of the device location. This is accomplished through a (novel) extension of SAR processing techniques to the passive detection of RF transmitters. Observance of relatively stringent timing requirements ensure that coherent processing can be performed.

A 50 m standoff would be acceptable for the intended military users and their envisioned operational scenarios. (Note that the system could be mounted on an unmanned robotic vehicle.)

Possible uses of the embodiments of the present invention include (i) monitoring secure areas. (ii) locating injured, hidden personnel who are equipped with an appropriate transmitter. The surveillance and location applications would also be valid for commercial uses of the invention.

As used herein the term "target" means the "transmitter of interest," area of interest, zone of interest or the like.

As used herein, the terminology "circuit" means a path between two or more points along which an electrical current can be carried.

As used herein, the term "subcircuit" means a distinct portion of an electrical circuit; a circuit within another circuit.

As used herein, the term "optimal" means most desirable or satisfactory result for an application or applications under specific conditions; resulting in the most favorable, reasonable conditions for operation of the system or device.

As used herein, the terminology "imager" includes but is not limited to a display, CRT, screen, or any image forming device.

As used herein the terminology Fourier transform includes but is not limited to a device or computer software or code which performs a Fourier Transform or a Fast Fourier transform. As defined in Wikipedia:

> The Fourier transform decomposes a function of time (a signal) into the frequencies that make it up, in a way similar to how a musical chord can be expressed as the frequencies (or pitches) of its constituent notes. The Fourier transform of a function of time itself is a complex-valued function of frequency, whose absolute value represents the amount of that frequency present in the original function, and whose complex argument is the phase offset of the basic sinusoid in that frequency. The Fourier transform is called the frequency domain representation of the original signal. The term Fourier transform refers to both the frequency domain representation and the mathematical operation that associates the frequency domain representation to a function of time. The Fourier transform is not limited to functions of time, but in order to have a unified language, the domain of the original function is commonly referred to as the time domain. For many functions of practical interest, one can define an operation that reverses this: the inverse Fourier transformation, also called Fourier synthesis, of a frequency domain representation combines the contributions of all the different frequencies to recover the original function of time.

As used herein the terminology "Hilbert transform" includes but is not limited to a device or computer software or code which performs a Hilbert Transform. As defined in Wikipedia:

> [a] Hilbert transform is a linear operator that takes a function, u(t) of a real variable and produces another function of a real variable H(u)(t). The Hilbert transform is important in signal processing, where it derives the analytic representation of a signal u(t). This means that the real signal u(t) is extended into the complex plane such that it satisfies the Cauchy-Riemann equations. For example, the Hilbert transform leads to the harmonic conjugate of a given function in Fourier analysis, aka harmonic analysis. Equivalently, it is an example of a singular integral operator and of a Fourier multiplier.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

The invention claimed is:

1. A passive radar apparatus for receiving signals from an unknown transmitting source and providing the location of the unknown transmitting source comprising:
   a series of channels, for receiving signals radiated by the unknown transmitting source, comprising a reference channel and at least one other channel; and
   one or more processors, which individually or in combination, are configured to:
      generate preprocessed time domain data by:
         identifying regularly-spaced frequencies in a corresponding frequency domain;
         determining pulses in a time domain data relating to the identified regularly-spaced frequencies;
         setting one pulse instance from the reference channel as a reference pulse; and
         correlating other pulse instances for the at least one other channel corresponding to the reference pulse to the reference pulse;
      generate, from the preprocessed time domain data, a synthetic aperture radar (SAR) image depicting an initial estimate of a location of the unknown transmitting source;
      refine the preprocessed time domain data based on a location of a maximum intensity in the generated SAR image; and
      produce an enhanced pixel value at each pixel location within the SAR image by summing signal data from each channel related to each pixel location using the further refined preprocessed time domain data to generate an enhanced SAR image depicting the location of the unknown transmitting source.

2. The apparatus of claim 1 wherein the one or more processors select a brightest pixel corresponding to the location of the maximum intensity in the SAR image as a reference pixel in enhancing pixels of the SAR image.

3. The apparatus of claim 2 wherein the one or more processors refine the preprocessed time domain data with respect to the reference pixel.

4. The apparatus of claim 1 wherein the one or more processors generate the SAR image and the enhanced SAR image with the preprocessed time domain data and the refined preprocessed time domain data, respectively, using Recursive Sidelobe Minimization.

5. The apparatus of claim 1 wherein each channel in the series of channels comprises:
   an amplifier for amplifying the received signal in that channel;
   at least one band pass filter operatively connected to at least one amplifier for selectively allowing passage of a signal within a predetermined frequency band;
   a mixer configured to combine the filtered received signal with a signal generated by a signal generator to create a combined signal having a common phase for each of the channels;
   an analog to digital converter configured to convert the combined signal into a digital signal;
   a processor coupled to the analog to digital converter for performing a Hilbert transform or in-phase quadrature process on the digital signal to create a single-sideband signal, performing a Fourier Transform on the single-sideband signal to convert the single-sideband signal from a time based signal to frequency components of which the single-sideband signal is composed, extracting regularly spaced frequency components originating from the unknown transmitting source, selecting the reference channel, and performing an inverse Fourier Transform on the extracted frequency components of each channel, and aligning the time domain magnitude and phase of each channel relative to the reference channel to create the preprocessed time domain data.

6. The apparatus of claim 5 wherein the frequency components are separated by at least 6 MHz.

7. The apparatus of claim 5 wherein the one or more processors extract regularly spaced frequency components from the received signal data and all other frequency components are discarded.

8. The apparatus of claim 1, wherein the one or more processors generate a time scale with which to correlate the preprocessed time domain data for each channel.

9. The apparatus of claim 8, wherein correlating other pulse instances for the at least one other channel corresponding to the reference pulse to the reference pulse comprises applying time shifts or phase correction to the other channels so those pulse instances align in phase with the reference pulse.

10. A method for receiving signals from an unknown transmitting source and providing the location of the unknown transmitting source using passive radar comprising:
   receiving signals, in a series of channels comprising a reference channel and at least one other channel, radiated by the unknown transmitting source;
   generating preprocessed time domain data from the received signals by:
      identifying regularly-spaced frequencies in a corresponding frequency domain;
      determining pulses in a time domain data relating to the identified regularly-spaced frequencies;
      setting one pulse instance from the reference channel as a reference pulse; and
      correlating other pulse instances for the at least one other channel corresponding to the reference pulse to the reference pulse;
   generating, from the preprocessed time domain data, a synthetic aperture radar (SAR) image depicting an initial estimate of a location of the unknown transmitting source;
   refining the preprocessed time domain data based on a location of a maximum intensity in the generated SAR image; and
   producing an enhanced pixel value at each pixel location within the SAR image by summing signal data from each channel related to each pixel location using the further refined preprocessed time domain data to generate an enhanced SAR image depicting the location of the unknown transmitting source.

11. The method of claim 10 wherein the processing step further comprises selecting a brightest pixel corresponding to the location of the maximum magnitude in the SAR image as a reference pixel in enhancing pixels of the SAR image.

12. The method of claim 11 wherein the refining step comprises refining the preprocessed time domain data with respect to the reference pixel.

13. The method of claim 12 wherein the SAR image and the enhanced SAR are generated with the preprocessed time domain data and the refined preprocessed time domain data, respectively, using Recursive Sidelobe Minimization.

14. The method of claim 10 wherein each channel in the series of channels performs:
   amplifying the received signal in that channel;
   filtering the amplified received signal to selectively allow passage of a signal within a predetermined frequency band;

combining the filtered received signal with a signal generated by a signal generator to create a combined signal having a common phase for each of the channels;

converting the combined signal into a digital signal;

performing a Hilbert transform or in-phase quadrature process on the digital signal to create a single-sideband signal;

performing a Fourier Transform on the single-sideband signal to convert the single-sideband signal from a time based signal to frequency components of which the single-sideband signal is composed;

extracting frequency components originating from the unknown transmitting source;

selecting the reference channel; and performing an inverse Fourier Transform on the extracted frequency components of each channel, and aligning the time domain magnitude and phase of each channel relative to the reference channel to create the preprocessed time domain data.

15. The method of claim 14 wherein the frequency components are separated by at least 6 MHz.

16. The method of claim 14 wherein the extracting step extracts regularly spaced frequency components from the received signal data and all other frequency components are discarded.

17. The method of claim 10, wherein the generating preprocessed time domain data step comprises generating a time scale with which to correlate the preprocessed time domain data for each channel.

18. The method of claim 17, wherein correlating other pulse instances for the at least one other channel corresponding to the reference pulse to the reference pulse channel comprises applying time shifts or phase correction to the other channels so those pulse instances align in phase with the reference pulse.

* * * * *